Oct. 5, 1954
C. R. TURNER ET AL
2,691,082
CIRCUIT CONTROLLING DEVICE
Original Filed Oct. 2, 1947
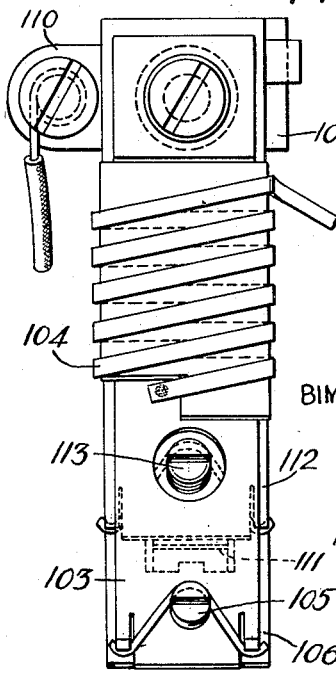
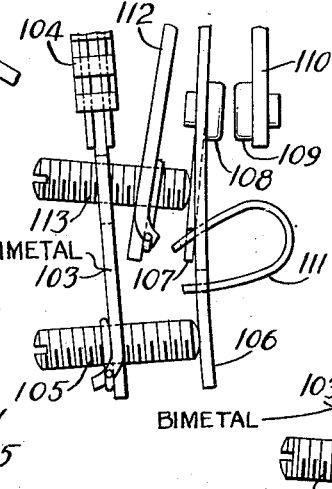
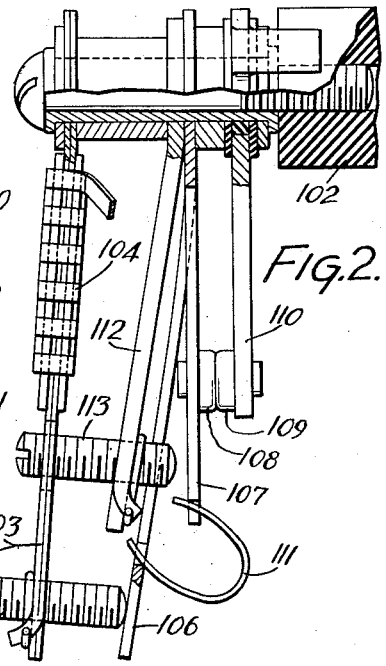
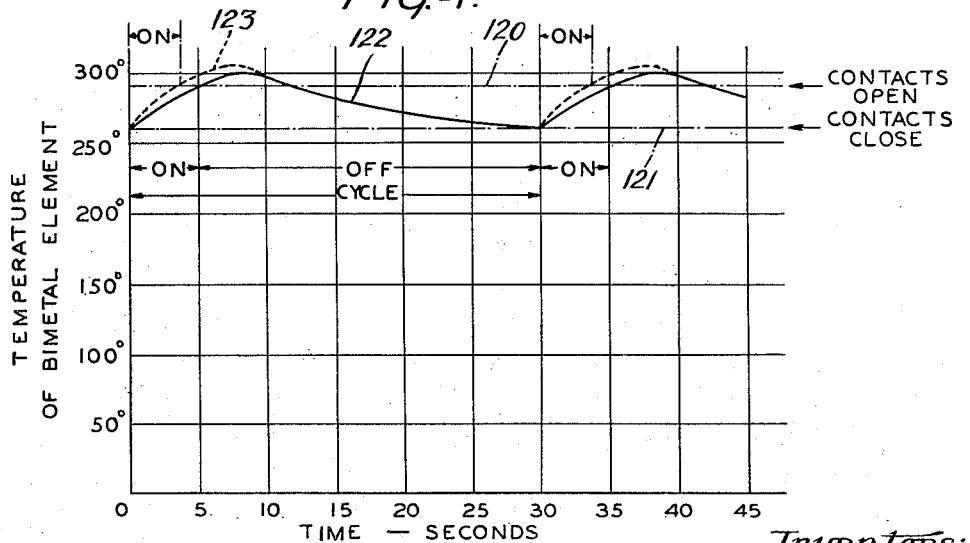
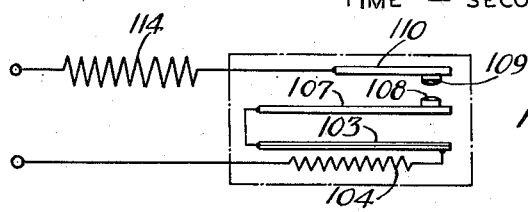
Inventors:
Charles Roger Turner
Paul Garfield Turner
by their Attorneys
Howson & Howson Patented Oct. 5, 1954

2,691,082

UNITED STATES PATENT OFFICE 2,691,082

CIRCUIT CONTROLLING DEVICE

Charles Roger Turner and Paul Garfield Turner, Enfield, Springfield Township, Montgomery County, Pa., assignors to Proctor Electric Company, Philadelphia, Pa., a corporation of Pennsylvania Original application October 2, 1947, Serial No. 777,496, now Patent No. 2,641,680, dated June 6, 1953. Divided and this application November 21, 1951, Serial No. 263,950

6 Claims. (Cl. 200—122)

This application is a division of application No. 777,496, filed October 2, 1947, now U. S. Patent No. 2,641,680, granted June 6, 1953.

The present invention relates to control of electric circuits and more particularly to a device which is adapted to effect cyclic opening and closing of an electric circuit. While it is intended that the device shall be applicable to any use for which it is suitable, it is especially intended to serve as a wattage controller and/or as a timer.

In some instances, it is advantageous to supply a predetermined average wattage to an electrical load by cyclic opening and closing of the energizing circuit for the load through operation of a thermal wattage controller which comprises a current-operable thermostatic switch. By way of example, such a wattage controller may be employed in automatic control apparatus for a pressure cooker, as disclosed in the above-mentioned parent application. When thus used, the wattage controller serves to effect reduced wattage input to a heater, so as to effect reduced heat input to the pressure cooker, after an initial heating up period during which full wattage is supplied to the heater. The same device may also serve to effect intermittent energization of a solenoid-ratchet device to time a pressure cooking operation, as also disclosed in the aforementioned parent application.

One object of the present invention is to provide an improved device of the above-mentioned character which is especially well suited to serve as a wattage controller and/or as a timer.

Another object of this invention is to provide such a device having provision for adjustment of its cycle time, and also having provision for adjustment of the on and off portions of its operating cycle.

Other objects and features of the invention will be apparent from the following description.

In the accompanying drawing,

Fig. 1 is a face view of a device embodying the present invention;

Fig. 2 is a side elevational view of the device with the support portion in partial section;

Fig. 3 is a fragmentary view showing the parts in the positions they assume when the switch contacts are open;

Fig. 4 is an explanatory graph; and

Fig. 5 is a diagrammatic illustration of the electrical circuit.

Referring first to Figs. 1 to 3, the elements of the device may be mounted on a common support 102. A bimetallic member 103 is activated by a small electrical heater 104 which preferably comprises suitable resistance wire wound about the bimetallic element and insulated therefrom. At its free end, the bimetallic element carries a set screw 105 which engages a resilient finger 106. A second resilient finger 107, which is struck out from the finger 106, carries a contact 108 which cooperates with a contact 109 on a stationary rigid arm 110. An over-center spring 111 has its ends secured to fingers 106 and 107 and forms therewith a toggle-like arrangement. A rigid arm 112 carries a set screw 113 which extends freely through finger 106 for engagement by finger 107. The bimetal element 103 has an opening therein to permit adjustment of screw 113 and to enable movement of the bimetal element without engaging said screw.

In operation, the bimetal element 103 flexes toward the right, as viewed in Fig. 2, in response to the heating effect of the heater 104. As the resilient finger 106 is thus moved toward the right, it passes finger 107 and as it does so, the spring 111 effects abrupt movement of contact 108 out of engagement with contact 109 and against screw 113. The opening of the contacts interrupts the current flow through the heater 104, and as the bimetal element 103 cools, it moves in the opposite direction until a reverse toggle-like action takes place causing closure of the switch contacts.

In Fig. 5, the device is diagrammatically represented in circuit with an electrical load in the form of a heating unit 114. The device operates cyclically to provide a predetermined average wattage input to the heating unit. As hereinbefore mentioned, the device may also serve as a timer. For that purpose a solenoid may be included serially in the circuit of Fig. 5 for intermittent energization by the controlling device, and the solenoid may be arranged to actuate a ratchet to effect a timing action, as disclosed in the aforementioned parent application.

Referring again to Figs. 1 to 3, the adjustable set screws 105 and 113 enable accurate adjustment of the device both to adjust the average wattage input to a controlled load and to adjust the cycling rate by adjusting the length of the cycle period, the latter adjustment being useful where the device serves as a timer. Adjustment of the set screw 105 varies the temperature which the bimetal element 103 must attain, and therefore the amount of flexing of this element required, to effect opening of the contacts 108 and 109 by the over-center spring 111. The adjustment of this screw also affects the temperature at which the bimetal permits the switch to close and thus generally may be considered as affecting the temperature level at which the device operates. The position of the set screw 113 determines the degree of separation of the contacts 108 and 109 when they are opened by the over-center spring 111, since the set screw 113 acts as a stop for the resilient contact finger 107. Adjustment of the set screw 113 varies the amount of movement of the bimetal element 103, during cooling thereof, which is necessary to cause the over-center spring to close the contacts. The adjustment of screw 113 thus changes the differential between the temperature at which the bimetal 103 opens contacts 108 and 109 and the temperature of the bimetal which permits contacts 108 and 109 to close.

The two adjusting screws 105 and 113, arranged in the manner described above, greatly simplify the problem of accurately adjusting the device in the factory to give the desired timing action and the desired energy input to a controlled load. It has been found that the number of trial and error adjustments can be minimized by following the simple procedure of, first, adjusting screw 105 until the input is correct and, secondly, of following this operation by adjustment of the screw 113 to bring the time cycle to its correct value. By performing the adjustments in this order, it is found that the adjusting of screw 113 has little or no effect on the average wattage input. Thus if it were observed that the input were too high, turning screw 105 in the clockwise direction would effect a decrease in the input with a resultant increase in the cycle time. A subsequent adjustment of screw 113 in the clockwise direction would decrease the cycle time with little and, in most cases, no effect on the previously adjusted input. When the device is used to control a pressure cooker, as in the apparatus of the aforementioned parent application, the cycle period of the device is preferably 30 seconds, and the time of energization of the controlled heating unit during each cycle of the device is preferably 5 seconds.

An additional feature of the device is its ability to compensate for changes of heat output of the heating element due to changes in line voltage. This may be seen with the aid of Fig. 4 which is a graphic illustration of the operation of the device. In this illustration, the temperature of the bimetal element is taken as the ordinate while time is taken as the abcissa. The horizontal dot and dash line 120 represents the temperature at which the contacts open, while the dot and dash line 121 represents the temperature at which the contacts close. The solid line curve 122 shows the operation for the normal voltage, i. e. 110 volts. This curve indicates that the "on" and "off" periods are 5 seconds and 25 seconds, respectively. The curve also shows that the temperature of the bimetal element overshoots the line 120 before cooling of said element commences. This is due to storage of heat in the heater associated with said element.

Now assume that the voltage rises to 120 volts. This will cause a greater heat output from the heating element 114. But the thermal controller compensates for this by decreasing the "on" period. As shown in Fig. 4, when the voltage increases to 120 volts, the temperature of the bimetal element rises along the dashed line curve 123 which has a greater slope than the rising portion of curve 122. Hence the "on" time is decreased because the temperature of the bimetal element rises more quickly to the "open" line 120. Moreover, the temperature overshoot is greater and this causes the cooling portion of the new curve to coincide with the old curve. Therefore the cycle time remains constant.

In the case supposed, the "on" time is reduced from 5 second to about 4.2 seconds. It can be shown by simple calculation that such reduction of the "on" time will maintain the heat output of the heating element 114 constant, and this has been demonstrated by actual tests.

While a particular form of the invention has been illustrated and described, it will be apparent that the invention is not limited thereto but is capable of various modifications and other embodiments.

We claim:

1. A circuit making and breaking device for effecting accurately timed cyclic opening and closing of an electrical circuit, comprising a switch, electrical heating means adapted to receive current when said switch is closed, thermomotive means operable by said heating means, means operable by said thermomotive means to open and close said switch upon attainment of different temperatures by said thermomotive means, adjustable means for varying the temperature at which said thermomotive means opens said switch, and other adjustable means for varying the temperature at which said thermomotive means closes said switch, whereby to enable adjustment of the time interval of an operating cycle and also to enable adjustment of the percentage of said time interval during which said switch is closed.

2. A circuit making and breaking device for effecting accurately timed cyclic opening and closing of an electrical circuit, comprising a switch, electrical heating means adapted to receive current when said switch is closed, means including a temperature-responsive element for opening and closing said switch upon attainment of different temperatures by said element, adjustable means for varying the temperature at which said element opens said switch, and other adjustable means for varying the temperature at which said element closes said switch, whereby to enable adjustment of the time interval of an operating cycle and also to enable adjustment of the percentage of said time interval during which said switch is closed.

3. A circuit making and breaking device for effecting accurately timed cyclic opening and closing of an electrical circuit, comprising a stationary contact, a first resilient arm fixed at one end and carrying a contact engageable with said stationary contact, a second resilient arm fixed at one end and disposed adjacent said first arm, a spring connected between said arms so as to effect snap action of said first arm by movement of said second arm whereby to open and close said contacts, a bimetal arm fixed at one end, heating means arranged to heat said bimetal arm and connected in series circuit with said contacts, an adjustable screw on said bimetal arm engageable with said second arm whereby the bimetal arm actuates said second arm, a rigid support member, and an adjustable screw on said support member engageable by said first arm to limit movement of the latter during opening of said contacts.

4. In a circuit making and breaking device for effecting accurately timed cyclic opening and closing of an electrical circuit, a stationary contact element, a movable contact element cooperatively associated with said stationary element for engagement and disengagement of said elements, a movable actuating member, an over-center spring connected to said movable contact element and said movable actuating member to move said movable contact element into and out of engagement with said stationary contact element upon movement of said actuating member in opposite directions, a bimetallic member arranged to effect movement of said actuating member in response to heating and cooling of the bimetallic member, an electrical heating element associated with said bimetallic member and connected in circuit with said contact elements, said heating element being energized when said contact elements are engaged and being deenergized when said contact elements are disengaged, whereby said contact elements are cyclically opened and closed, an adjustable screw on said bimetallic member engageable with said actuating member and serving to control the amount of movement of said bimetallic member necessary to effect opening of said contact elements, and a normally-stationary adjustable screw engageable by said movable contact element and serving to control the amount of movement of said bimetallic member necessary to effect closing of said contact elements.

5. In a current-operated cyclic thermostatic switch in which a thermostatic member is cyclically heated by electrical heating means and cooled, and actuates a movable switch element through an over-center spring which effects snap opening and closing of the switch contacts in response to heating and cooling movements of said thermostatic member, and in which an adjustment is provided between the thermostatic member and the movable switch element and another adjustment is provided to limit the opening movement of said element, a method of adjusting the ratio of the on time to the total cycle time and also adjusting the total cycle time without substantially affecting said ratio, which method comprises first establishing through said first adjustment a particular travel of said thermostatic member on heating to effect over-center movement of said spring to cause snap opening of the switch contacts, and then establishing through said second adjustment a particular limit of travel of said switch element on opening of the switch contacts so that a certain movement of said thermostatic member on cooling will effect over-center movement of said spring to cause snap closing of the switch contacts.

6. A circuit making and breaking device for effecting accurately timed cyclic opening and closing of an electrical circuit, comprising switch means including a pair of contacts to open and close said circuit, electrical heating means controlled by said switch means, means including a temperature-responsive element operable by said heating means for actuating said switch means so as to open and close said contacts upon attainment of different temperatures by said element, adjustable means for varying the temperature at which said element opens said contacts, and other adjustable means for varying the temperature at which said element closes said contacts, whereby to enable adjustment of the time interval of an operating cycle and also to enable adjustment of the percentage of said time interval during which said contacts are closed.

References Cited in the file of this patent

UNITED STATES PATENTS

| Number | Name | Date |
|---|---|---|
| 2,521,120 | Harrold | Sept. 5, 1950 |
| 2,521,277 | Aubert | Sept. 5, 1950 |